(12) United States Patent
Smith

(10) Patent No.: US 12,084,001 B2
(45) Date of Patent: Sep. 10, 2024

(54) HITCH-MOUNTED DOOR CARRIER ASSEMBLY

(71) Applicant: Donald Smith, Lithonia, GA (US)

(72) Inventor: Donald Smith, Lithonia, GA (US)

(*) Notice: Subject to any disclaimer, the term of this patent is extended or adjusted under 35 U.S.C. 154(b) by 0 days.

(21) Appl. No.: 18/403,903

(22) Filed: Jan. 4, 2024

(65) Prior Publication Data

US 2024/0227690 A1 Jul. 11, 2024

Related U.S. Application Data

(60) Provisional application No. 63/478,759, filed on Jan. 6, 2023.

(51) Int. Cl.
*B60R 9/06* (2006.01)

(52) U.S. Cl.
CPC ........................................ *B60R 9/06* (2013.01)

(58) Field of Classification Search
CPC ........................................................ B60R 9/06
See application file for complete search history.

(56) References Cited

U.S. PATENT DOCUMENTS

| | | | |
|---|---|---|---|
| 5,439,151 A | 8/1995 | Clayton | |
| 5,544,799 A | 8/1996 | Didlake | |
| 6,237,823 B1 | 5/2001 | Stewart et al. | |
| 6,889,881 B2 * | 5/2005 | Wilkens | B60R 9/065 224/511 |
| 7,275,670 B1 | 10/2007 | Shumack et al. | |
| 7,641,235 B1 | 1/2010 | Anduss | |
| 8,061,572 B2 | 11/2011 | Myrex | |
| 9,623,807 B2 | 4/2017 | Singleton | |
| 10,017,093 B1 * | 7/2018 | Murphy | B66F 7/065 |
| 10,150,420 B2 * | 12/2018 | Stojkovic | B60J 5/047 |
| 10,384,499 B2 | 8/2019 | Schocke et al. | |
| 10,407,087 B1 | 9/2019 | Baker et al. | |
| 10,981,588 B1 * | 4/2021 | Poudrier | B62B 3/02 |
| 11,597,329 B2 * | 3/2023 | Stump | B60R 9/06 |
| 2004/0173654 A1 | 9/2004 | McAlister | |

(Continued)

OTHER PUBLICATIONS

Jeep JK Door Storage Carrier, HitchWorx, https://www.hitchworx.com/products/freedom-rack-jk-2-door, Retrieved: Dec. 9, 2022, 2 pgs.

(Continued)

*Primary Examiner* — Brian D Nash
(74) *Attorney, Agent, or Firm* — BEKIARES ELIEZER LLP

(57) ABSTRACT

A platform may include a vehicle door case comprising a base and a case body having cavities. Each cavity is configured to receive a removed vehicle door. Retractable wheels are affixed to the case, each wheel being configured to retractably extend from the base, and disposed at a corner of the case. A securing bracket includes: a back bracket attached to a back of the case and configured to extend through a window opening of at least one vehicle door; and a front bracket attached to a front of the case and configured to extend through a window opening of at least one vehicle door. A mount permits rotation of the case, and includes a case support member rotatably secured to the base, a hitch connecting member extending from the case securing portion, and a door case securing portion configured to fixedly secure the mount to the case.

20 Claims, 8 Drawing Sheets

(56) References Cited

U.S. PATENT DOCUMENTS

| | | | |
|---|---|---|---|
| 2005/0200099 A1* | 9/2005 | Moberly | B60D 1/363 |
| | | | 280/477 |
| 2006/0011684 A1* | 1/2006 | Wills | B60R 9/06 |
| | | | 224/512 |
| 2006/0065688 A1 | 3/2006 | Hasz | |
| 2006/0145461 A1 | 7/2006 | Anderson | |
| 2006/0151555 A1 | 7/2006 | Mills | |
| 2007/0181624 A1* | 8/2007 | Smith | B60R 9/00 |
| | | | 224/533 |
| 2009/0152314 A1 | 6/2009 | Myrex | |
| 2015/0042071 A1 | 2/2015 | Hamm | |
| 2015/0283951 A1* | 10/2015 | Singleton | B60J 7/106 |
| | | | 224/519 |
| 2016/0272229 A1 | 9/2016 | Buckner | |
| 2016/0288728 A1 | 10/2016 | Sampson | |
| 2018/0037074 A1* | 2/2018 | Schocke | B60R 9/06 |
| 2018/0050712 A1 | 2/2018 | Mitchell | |
| 2019/0176319 A1* | 6/2019 | Wiltsey | B62B 1/208 |
| 2019/0331291 A1* | 10/2019 | Poudrier | F16M 11/22 |
| 2021/0155305 A1 | 5/2021 | Hall | |
| 2022/0266760 A1 | 8/2022 | Larkins | |

OTHER PUBLICATIONS

International Search Report and Written Opinion dated May 30, 2024 cited in Application No. PCT/US24/10423, 14 pgs.

* cited by examiner

HITCH-MOUNTED DOOR CARRIER ASSEMBLY

RELATED APPLICATION(S)

Under provisions of 35 U.S.C. § 119(e), the Applicant claims the benefit of U.S. Provisional Application No. 63/478,759, filed Jan. 6, 2023, which is incorporated herein by reference in its entirety.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to hitch-mountable storage devices and vehicle door carriers.

BACKGROUND

Some vehicles may have doors configured to be easily removed, if desired by an operator. For example, various Jeep™ models have removable doors that require minimal effort for removal. The conventional strategy for storing the removed doors is to either leave the doors elsewhere (e.g., at an operator's home) or to store the doors in a compartment within the vehicle, such as the trunk, cargo area, and/or back seats. This often causes problems. For example, in the case of leaving the doors elsewhere, the strategy does not account for inclement weather conditions (e.g., rain, wind, etc.) requiring the doors to be reattached in a quick manner. While storing the doors in a vehicle's compartments may solve this problem, the doors take up some or all of the available space for other passengers and/or cargo.

Further, current door carrying devices mounted on a hitch present various other usability issues. For example, the weight of the doors often results in an inability for the operator to mount (e.g., connect) or dismount (e.g., disconnect) the carrying device with the doors attached to the vehicle. In particular, the overall weight makes such mounting and/or dismounting impossible, difficult, or impractical. Current door carrying devices also fail to allow for access to rear compartments of the vehicle when the carrying devices are mounted to the vehicle. That is, the carrying device itself and/or the doors stored within the carrying device may prevent the vehicle operator from accessing the rear compartments (e.g., cargo area and/or trunk) of the vehicle.

Accordingly, there is a need for a door carrying device that allows for full functionality of the vehicle it is attached to, while allowing for easy mounting and dismounting, irrespective of whether or not the doors are attached to or stored within the carrying device.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Embodiments of the present disclosure provide a hitch-mounted door carrier assembly comprising: a vehicle door case comprising: a front side, a back side, a left side, a right side, a bottom side, and a top side comprising: a substantially planar surface, a plurality of apertures forming a plurality of cavities, each of the plurality of apertures being dimensioned to receive at least a portion of one of the vehicle doors, and each of the plurality of cavities being dimensioned to house one of the plurality of vehicle doors; a plurality of wheels configured to retractably extend orthogonally to the top side and bottom side, each of the plurality of wheels being disposed at a corner of the vehicle door case; a plurality of brake lights configured to be operatively connected to vehicle brake lights and disposed on the back side of the vehicle door case; a back bracket spanning a portion the back side and extending upward from the back side of the vehicle door case; a front door case wall spanning a portion the front side and extending upward from the front side of the vehicle door case; a back securing bracket having an inverted "L" shape extending upward from the back side of the vehicle door case and configured to extend through a window aperture of at least a portion of the plurality of vehicle doors comprising: a back securing first section extending upward from the back side of the vehicle door case, and a back securing second section secured to a distal end of the first section furthest from the back side and configured to extend through a window aperture of at least a portion of the plurality of vehicle doors; a front securing bracket having an inverted "L" shape extending upward from the front side of the vehicle door case and configured to extend through a window aperture of at least another portion of the plurality of vehicle doors, the front securing portion being configured to secure to a portion of the back securing portion comprising: a front securing first section extending upward from the front side of the vehicle door case, and a front securing second section secured to a distal end of the first section furthest from the back side and configured to extend through a window aperture of at least a portion of the plurality of vehicle doors, wherein the front securing bracket is configured to secure to a distal end of the back securing second section; and a pivotable mount configured to pivotably rotate the vehicle door case, the frame comprising: a door case support member rotatably secured to the bottom side of the vehicle door case, a hitch connecting member extending from the case securing portion, and a door case securing portion configured to fixedly secure the pivotable mount to the door case.

Embodiments of the present disclosure may further provide a method for securing a plurality of vehicle doors to a hitch-mounted door carrier assembly, the method comprising: removing a plurality of doors from a vehicle; placing each of the plurality of doors into a cavity of a hitch-mounted door carrier assembly; vertically orienting a first section of a front securing bracket such that a second section of the front securing bracket is extended through window apertures of at least a portion of the plurality of doors; vertically orienting a first section of a second securing bracket such that a second section of the second securing bracket is extended through window apertures of at least a portion of the plurality of doors and in physical contact with the second section of the front securing bracket; and fixedly securing the first securing bracket to the second securing bracket such that the plurality of doors are prevented from undesired removal from the hitch-mounted door carrier assembly.

Embodiments of the present disclosure may further provide a method for dismounting a hitch-mounted door carrier assembly from a vehicle hitch, the method comprising: providing a hitch-mounted door carrier assembly secured to a vehicle hitch; vertically extending the one or more retractable casters such that wheels on the one or more retractable casters contact a surface below the apparatus; placing the one or more retractable caters in a locked position such that vertical movement is inhibited; disengaging a hitch connecting member of a pivotable mount from a vehicle hitch; and transferring the weight of the door case from the hitch to the one or more retractable casters.

In some aspects, the techniques described herein relate to a hitch-mounted door carrier assembly including: a vehicle door case including a base, and a case body, the case body having a plurality of cavities, wherein each of the plurality of cavities is configured to receive and retain a door removed from a vehicle a plurality of retractable wheels affixed to the vehicle door case, each of the plurality of wheels being configured to retractably extend orthogonally to the base, each of the plurality of wheels being disposed at a corner of the vehicle door case; a securing bracket including: a back bracket having a first portion or spacing bar configured to attach to a back side of the vehicle door case and a second portion or securing bar configured to extend orthogonally from the first portion and through a window opening of at least one vehicle door, of the plurality of vehicle doors, a front bracket having a first portion or spacing bar configured to attach to a front side of the vehicle door case and a second portion or securing bar configured to extend orthogonally from the first portion and through a window opening of at least one vehicle door, of the plurality of vehicle doors, wherein the front portion and the rear portion are configured to lockingly connect to one another; and a pivotable mount configured to permit rotation of the vehicle door case, the pivotal mount including: a door case support member rotatably secured to the base of the vehicle door case, a hitch connecting member extending from the case securing portion, and a door case securing portion configured to fixedly secure the pivotable mount to the door case.

In some aspects, the techniques described herein relate to an apparatus configured to be mounted to a vehicle hitch, the apparatus including: a door case configured to receive and retain one or more removable doors of the vehicle; a plurality of wheel assemblies retractably mounted to the door case, each wheel assembly including: a wheel, a retractable leg, wherein the retractable leg connects the wheel to the door case, and a locking mechanism configured to selectively inhibit movement of the retractable leg, wherein the wheel assembly is configured to move between: an extended position in which the leg extends downward from the door case to a surface below the door case, and a collapsed position in which the wheel is held proximate to the door case; a security bracket configured to move between: an open configuration that allows at least one of the one or more removable doors to be removed from the door case, and a locked configuration that prevents the one or more doors from being removed from the door case; and a rotatable hitch configured to releasably connect the door case to the vehicle, the rotatable hitch configured to selectively allow the door case to rotate about an axis defined by a corner of the door case, the rotatable hitch. In embodiments, the assembly may rotate approximately 45 degrees, approximately 90 degrees, approximately 135 degrees, or any amount sufficient to allow an operator to access a rear gate of a vehicle.

In some aspects, the techniques described herein relate to an apparatus configured to be mounted to a vehicle hitch, the apparatus including: a door case including one or more cavities, each cavity being configured to receive and retain a corresponding door of the vehicle; a plurality of wheel assemblies retractably mounted to the door case, each wheel assembly being configured to move between: an extended position in which a leg of the wheel assembly extends downward from the door case such that a wheel of the wheel assembly contacts a surface below the door case, and a collapsed position in which the wheel assembly is held proximate to the door case; a security bracket configured to selectively prevent removal of the doors from the one or more cavities; a rotatable hitch configured to releasably connect the door case to the vehicle, the rotatable hitch configured to allow the door case to rotate about an axis defined by a corner of the door case.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
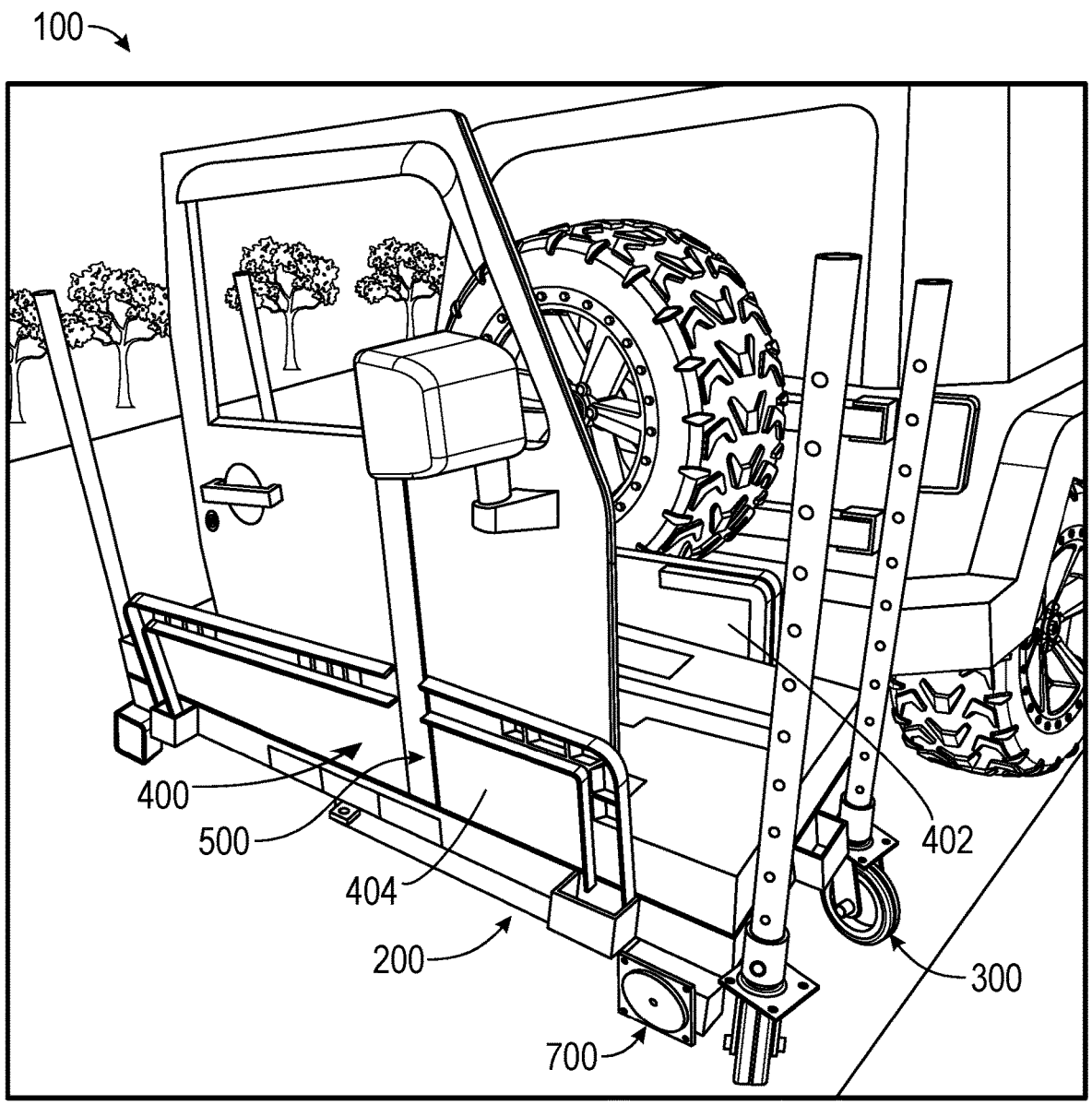
FIG. 1 illustrates a rear perspective view of a hitch-mounted door carrier assembly, mounted to a vehicle.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, 16, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of hitch-mountable storage devices and vehicle door carriers, such as the Duck Doors product, embodiments of the present disclosure are not limited to use only in this context.

I. Apparatus Overview

This overview is provided to introduce a selection of concepts in a simplified form that are further described below. This overview is not intended to identify key features or essential features of the claimed subject matter. Nor is this overview intended to be used to limit the claimed subject matter's scope.

A hitch-mounted door carrier assembly ("apparatus") may be provided. the apparatus may be used to store and secure removable vehicle doors, such as that of a Jeep™. To achieve this, the door carrier assembly may include a case having one or more cavities. Each cavity may be accessible from accessible from at least one side of the case. The one or more cavities may be dimensioned to receive and retain a particular door or set of doors corresponding the vehicle.

The case may have one or more walls protruding upwards from one or more sides of the case. The one or more walls may further assist in retaining, protecting, and/or securing the doors and/or any other object housed within in or on top of the case. In some aspects, the one or more walls may be collapsible and/or foldable to allow for increased versatility and variation of the apparatus.

The apparatus may have retractable casters located at corners of the case. The retractable casters may assist in disengaging the apparatus from a hitch of the vehicle. In particular, the casters may be lowered such that each caster contacts the ground or a surface below the apparatus. The position of the casters may be locked in place, so as to maintain the same height when the apparatus is disengaged *e.g., dismounted, disconnected) from the vehicle. The casters may be used to roll the apparatus away from the hitch (e.g., across the ground or surface) while maintaining the height of the apparatus with or without the doors secured on the apparatus.

To help secure the vehicles doors, the apparatus may include brackets configured to extend upward from two sides of the case and extend horizontally through window holes of the one or more vehicle doors (e.g., having the windows removed or retracted down into the doors). The brackets may lock in this position, thereby preventing unwanted removal of the vehicle doors from the apparatus 100. In some embodiments, the brackets may be foldable, collapsible, and/or retractable.

The apparatus may include a mount for connecting the apparatus to the vehicle. The mount may be secured to a bottom side of the case. In some embodiments, the mount may be secured in such a way that the case is capable of being horizontally pivoted relative to the vehicle to which the case is attached. The mount may have a hitch mounting portion extending from the mount and configured to secure to a vehicle hitch. The mount may further have a flange and/or other suitable type of securing portion configured to secure to the case. For example, the flange of the mount may be secured to a protrusion located on the back side of the case. When the apparatus is in a secured position, the mount and the back side of the case are secured to one another, preventing pivoting of the case relative to the mount. When the apparatus is in a pivotable position, the mount and the back side of the case are disengaged from one another, thereby allowing horizontal axial rotation of the case relative to the mount.

Brake lights may be included in the apparatus and may be configured to electrically connect to a brake light circuit of the vehicle to which the apparatus is attached. The brake lights added to the apparatus may contribute to brake light visibility and operability when the apparatus is secured to a vehicle.

Embodiments of the present disclosure may comprise methods, systems, and components comprising, but not limited to, at least one of the following:

A. A Door Case 200;
B. One or More Retractable Casters 300;
C. Door Case Walls 400;
D. Securing Brackets 500; and
E. A Mount 600.

In some embodiments, the present disclosure may provide an additional set of components for further facilitating the system. The additional set of components may comprise, but not be limited to:

F. One or More Brake Lights 700.

Details with regard to each component are provided below. Although components are disclosed with specific functionality, it should be understood that functionality may be shared between components, with some functions split between components, while other functions duplicated by the components. Furthermore, the name of the component should not be construed as limiting upon the functionality of the component. Moreover, each stage disclosed within each component can be considered independently without the context of the other stages within the same component or different components. Each stage may contain language defined in other portions of this specifications. Each stage disclosed for one component may be mixed with the operational stages of another component. In the present disclosure, each stage can be claimed on its own and/or interchangeably with other stages of other components.

The following depicts an example of a method of a plurality of methods that may be performed by at least one of the aforementioned components. Various hardware components may be used at the various stages of operations disclosed with reference to each component. For example, although methods may be described to be performed by a single apparatus, it should be understood that, in some embodiments, different operations may be performed by different apparatuses in operating in conjunction with each other. For example, a hitch-mounted door carrier assembly or apparatus 100 may be employed in the performance of some or all of the stages disclosed with regard to the methods. Similarly, one apparatus may be employed in the performance of some or all of the stages of the methods. As such, the apparatus may comprise at least one of the architectural components disclosed herein.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, a method may be performed by at least one of the aforementioned components. The method may be embodied as, for example, but not limited to, computer instructions, which when executed, perform the method. The method may comprise the following stages:

removing one or more doors from a vehicle;
vertically extending one or more retractable casters downward from a hitch-mounted door carrier assembly such that wheels on the one or more retractable casters contact a surface below the hitch-mounted door carrier assembly;
placing the one or more retractable casters in a locked position such that vertical movement is inhibited;
placing the one or more doors into one or more corresponding cavities of a hitch-mounted door carrier assembly;
vertically orienting a first section of a first securing bracket such that a second section of the first securing bracket extends through a window aperture of at least one of the one or more doors;
vertically orienting a first section of a second securing bracket such that a second section of the second securing bracket extends through a window aperture of at least one of the one or more doors and contacts the second section of the first securing bracket;
fixedly securing the first securing bracket to the second securing bracket such that the one or more doors are prevented from undesired removal from the hitch-mounted door carrier assembly;
securing the hitch-mounted door carrier assembly to a vehicle hitch;
vertically retracting the one or more retractable casters such that wheels on the one or more retractable casters no longer contact the surface;
operating the vehicle to tow the hitch-mounted door carrier assembly;
vertically extending the one or more retractable casters such that wheels on the one or more retractable casters contact the surface below the hitch-mounted door carrier assembly;
placing the one or more retractable caters in the locked position such that vertical movement is inhibited;
disengaging a hitch connecting member of a pivotable mount from the vehicle hitch; and
transferring the weight of the hitch-mounted door carrier assembly from the hitch to the one or more retractable casters.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. System Configuration

The term "vehicle hitch" may be used interchangeably with the term "hitch". Either term may be applicable to refer to any type of vehicle-trailer connecting means compatible with the scope of the present disclosure.

It is noted that the term "side" may be used interchangeably with the term "surface".

Embodiments of the present disclosure provide a hitch-mountable door carrier assembly or apparatus 100 ("apparatus 100") comprised of a set of components, including, but not limited to:

A. Door Case 200

Figure 2:
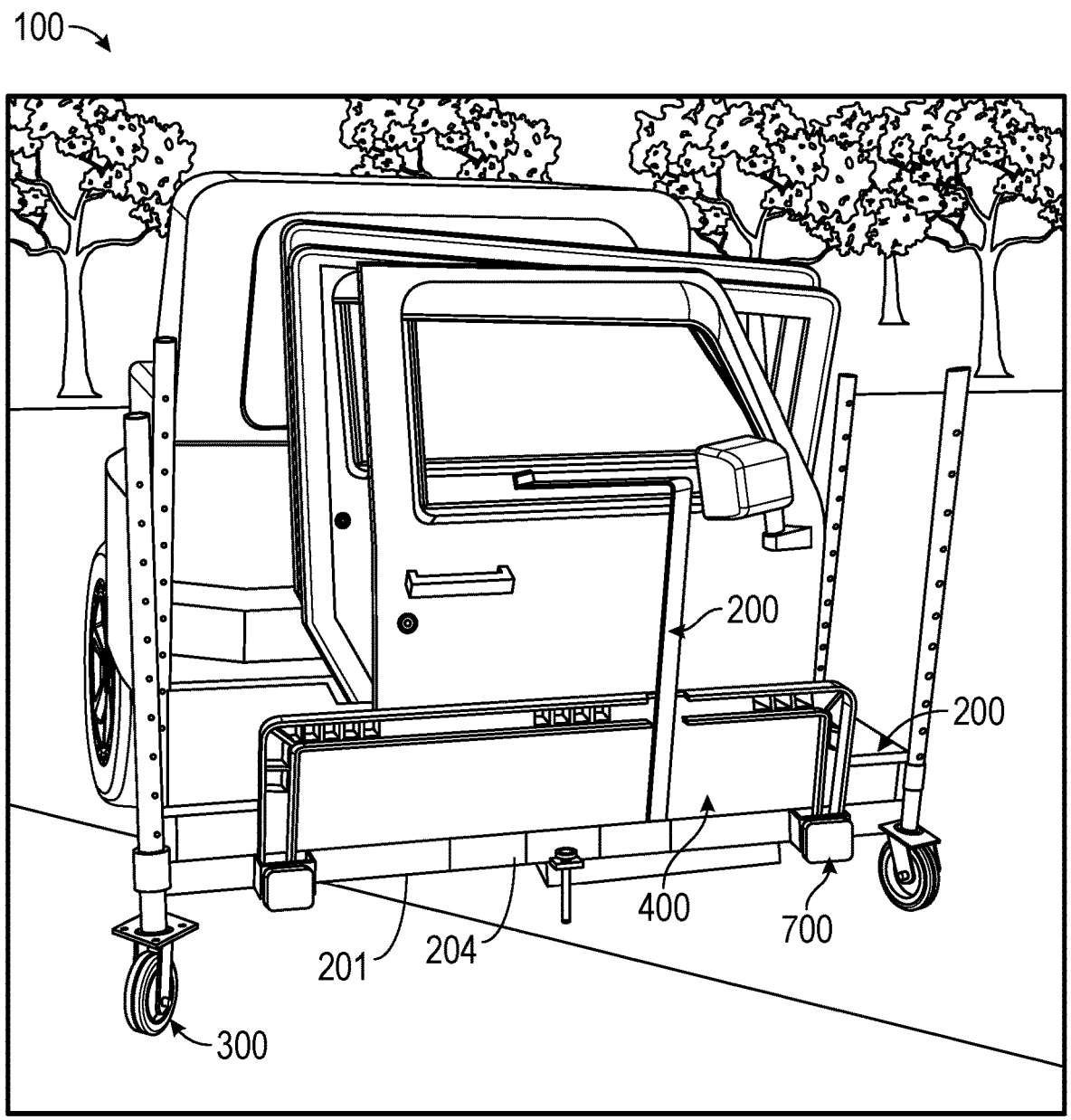
FIG. 2 illustrates a rear view of the hitch-mounted door carrier assembly.
Figure 3:
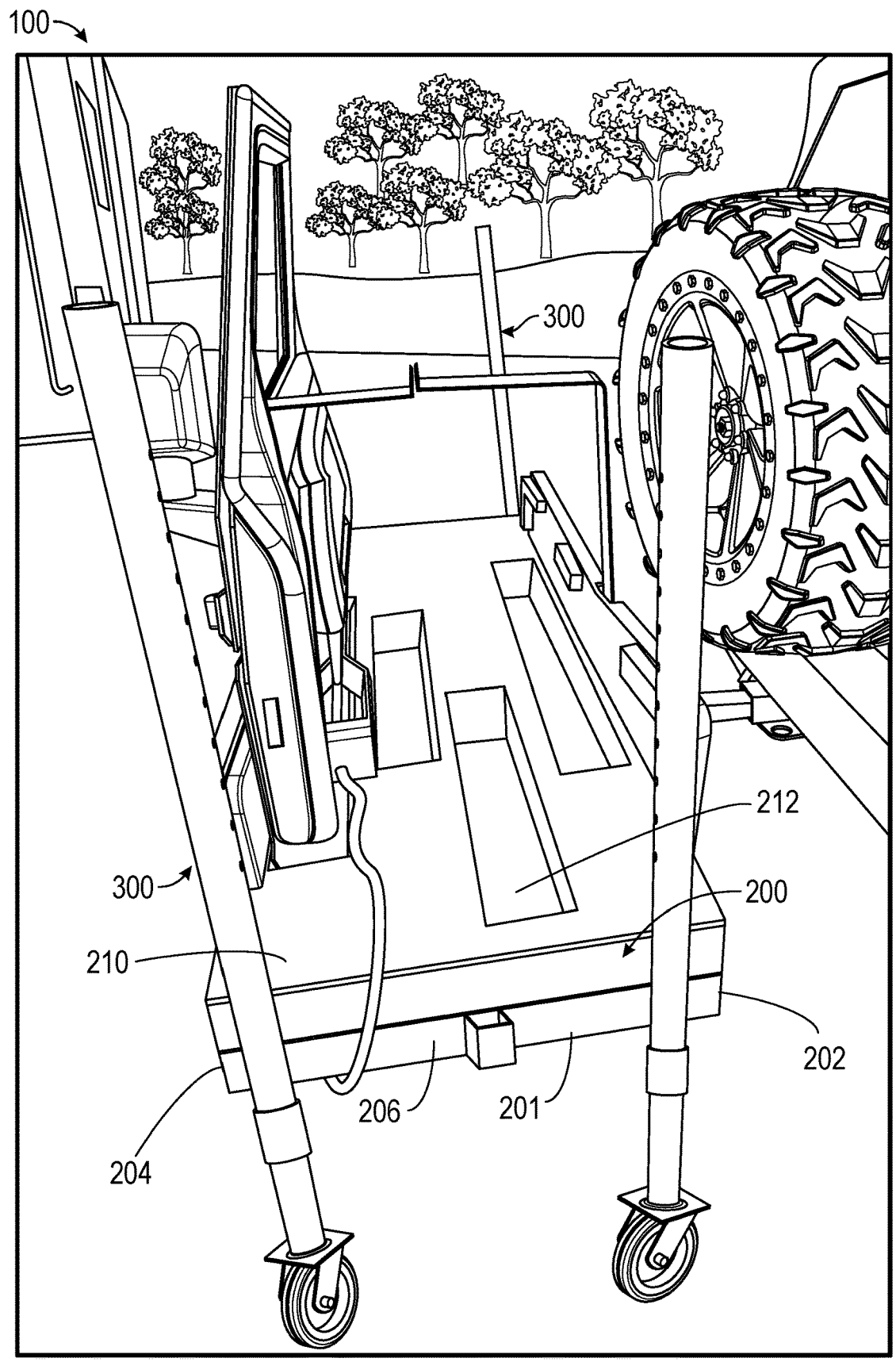
FIG. 3 illustrates a side view of the hitch-mounted door carrier assembly in a closed position.
Figure 4:
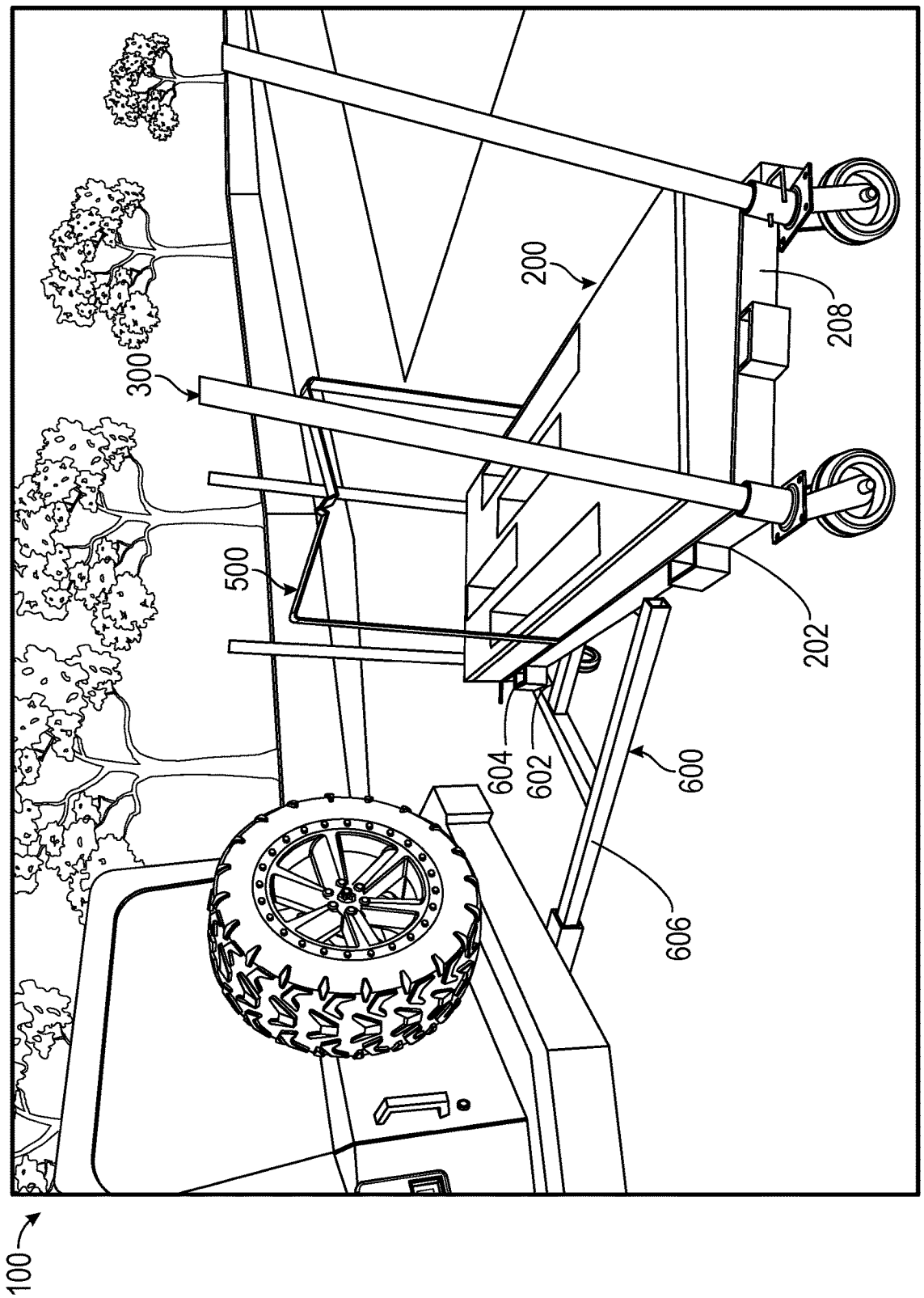
FIG. 4 illustrates a side view of the hitch-mounted door carrier assembly in an open position.
Figure 5:
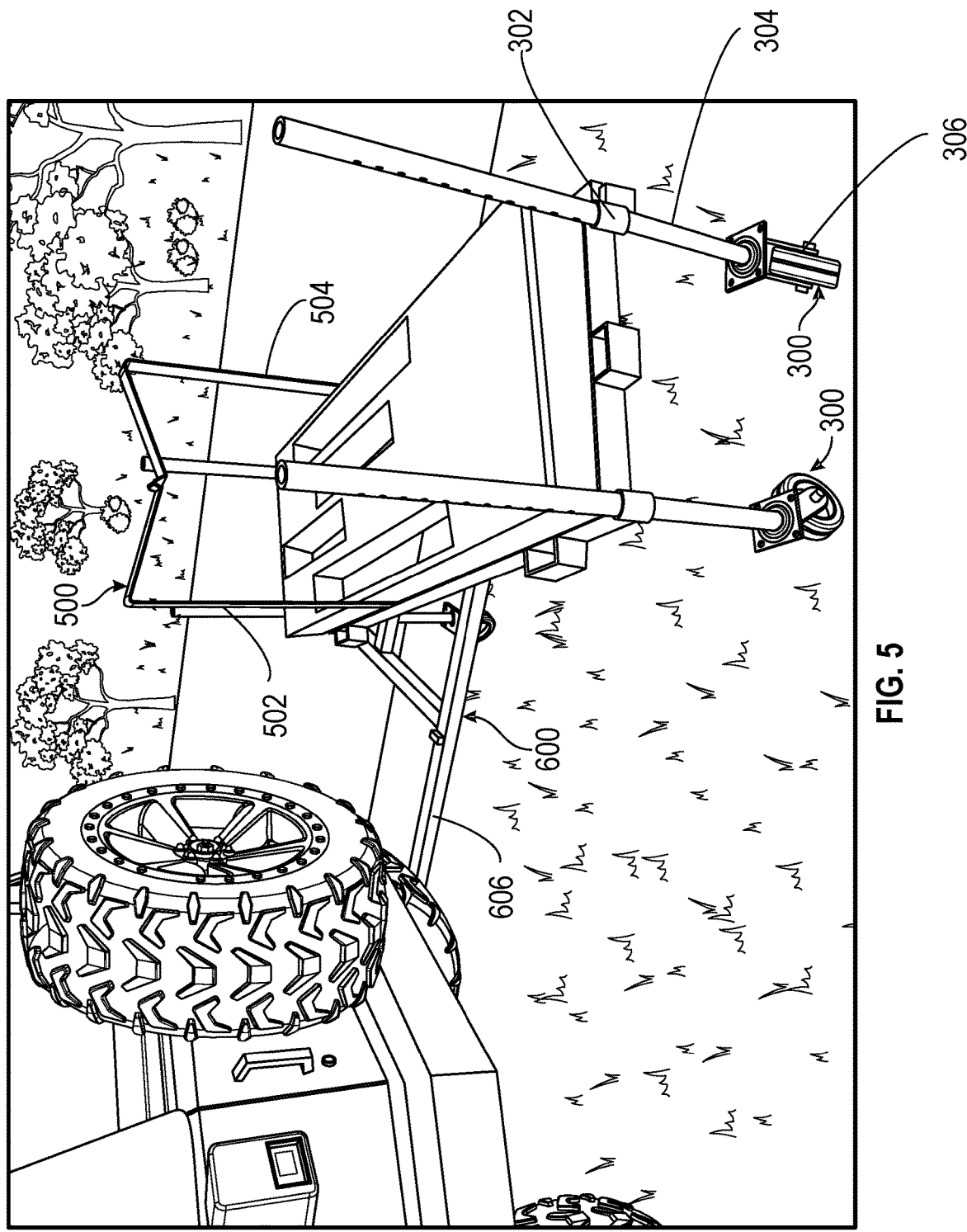
FIG. 5 illustrates a side view of the hitch-mounted door carrier assembly in the open position, and with the wheel assemblies in the extended position.
Figure 6:
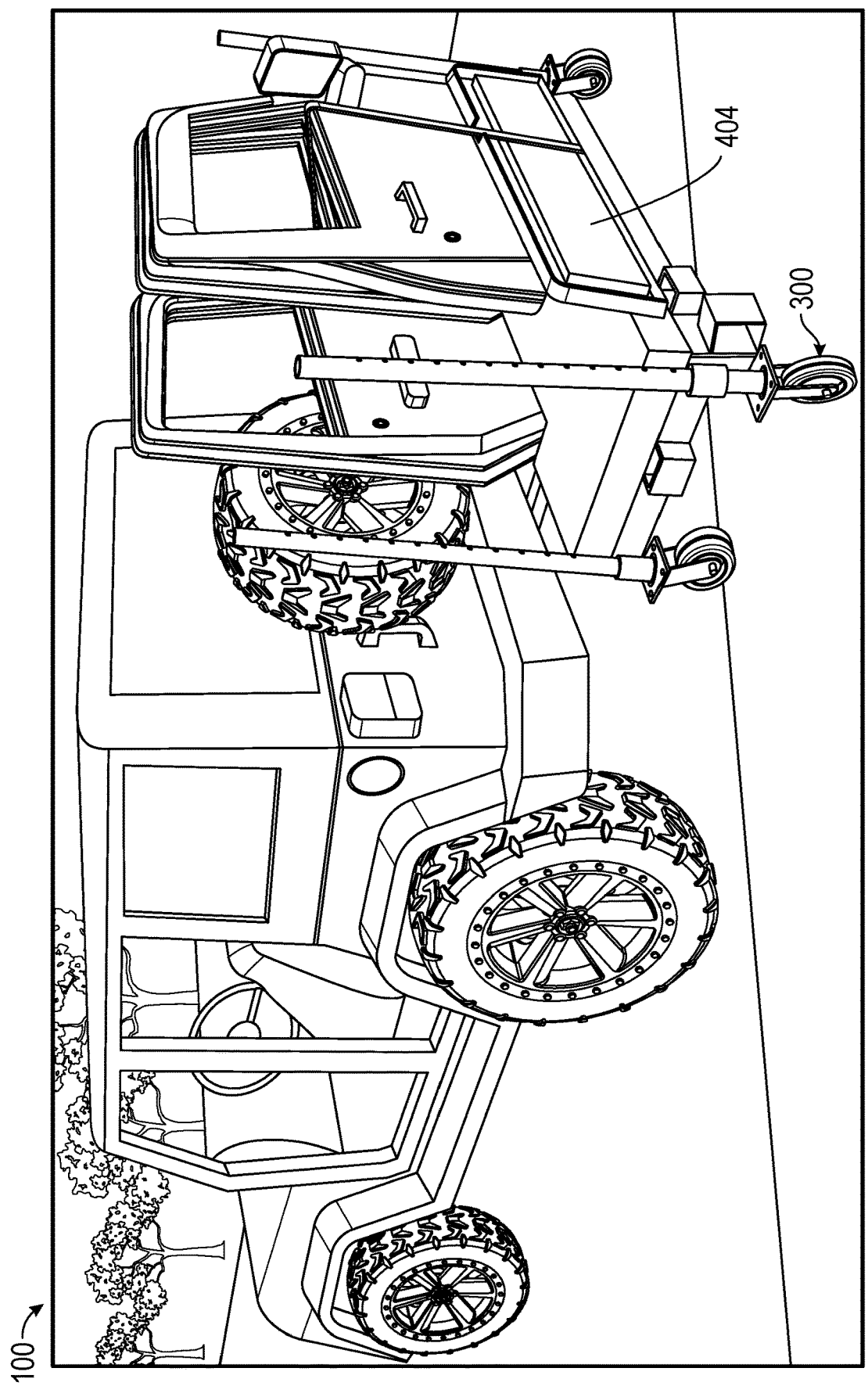
FIG. 6 further illustrates the hitch-mounted door carrier assembly.
Figure 7:
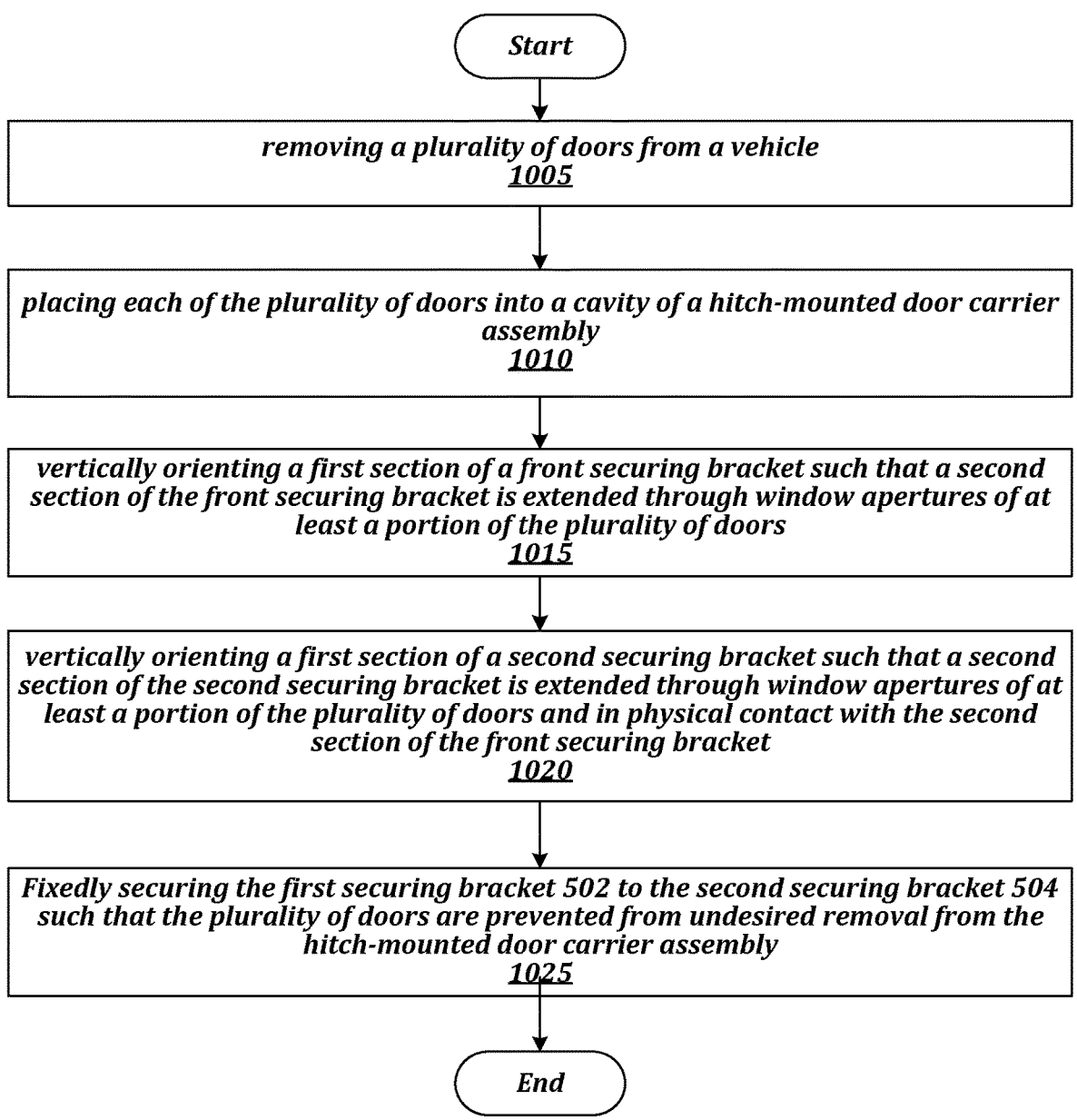
FIG. 7 illustrates a method 1000 for securing a plurality of vehicle doors to a hitch-mounted door carrier assembly.
Figure 8:
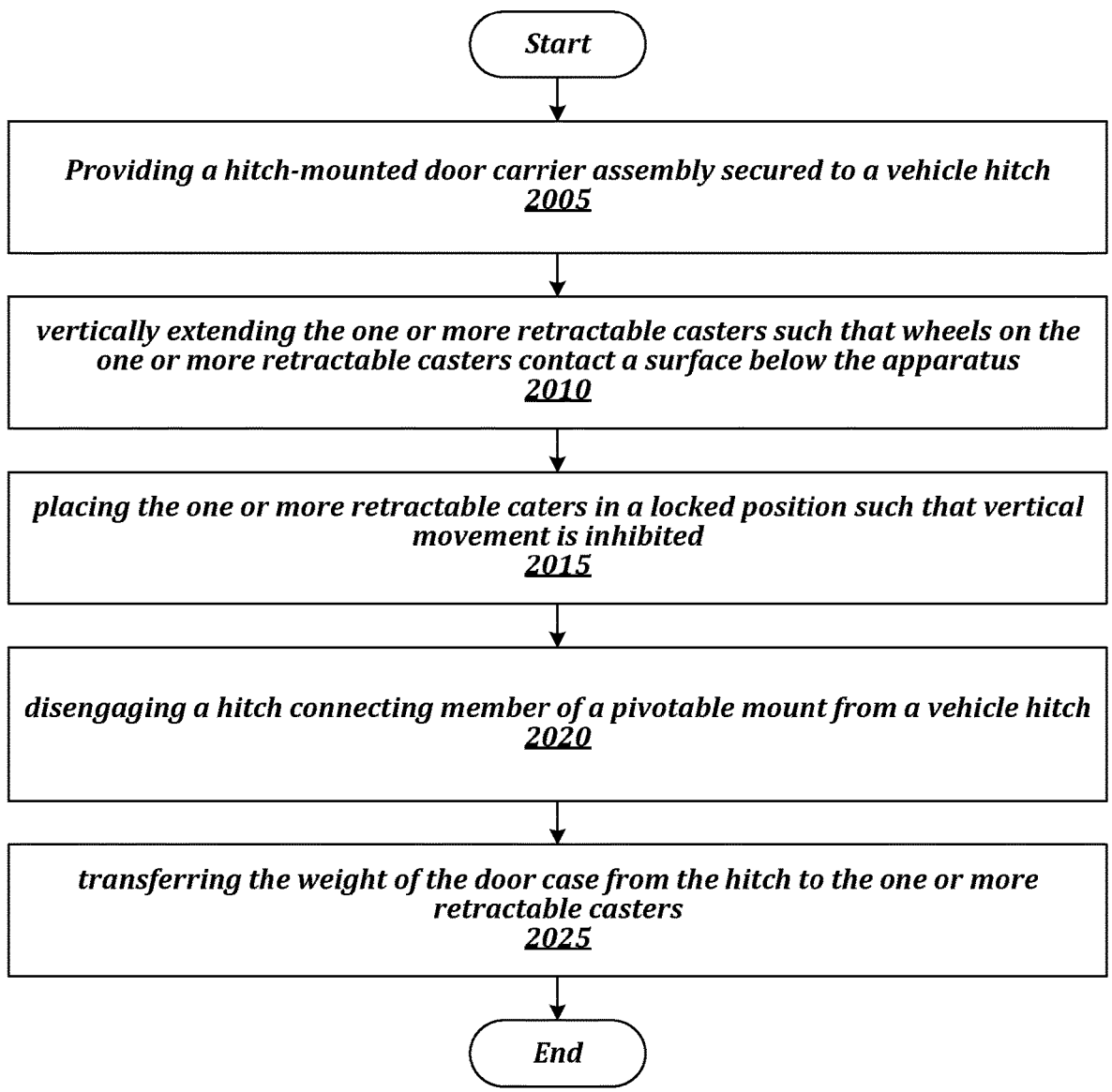
FIG. 8 illustrates a method 2000 for dismounting a hitch-mounted door carrier assembly from a vehicle hitch.

As shown in at least FIGS. 1-6 the apparatus 100 includes a door case 200. The door case 200 may house (e.g., receive and retain) at least a portion of one or more vehicle doors. The door case 200 may be used as a base to which other components of the apparatus 100 may be secured.

In some embodiments, the door case 200 may be shaped substantially as a rectangular prism or cuboid. In some embodiments, the door case 200 may comprise a frame 201. At least a portion of the frame 201 may be made from any rigid and/or semi-rigid material such as, but not limited to, for example, steel, aluminum, a metal alloy, and/or any other suitable material. The frame 201 may be used to retain, house, and/or receive at least a portion of a door retaining portion 210. In some embodiments, the frame 201 may comprise a frame front side 202. When mounted to a vehicle (e.g., via a vehicle trailer hitch), the frame front side 202 may be the portion of the frame 201 in nearest proximity to the vehicle and/or vehicle trailer hitch. The frame front side 202 may span a length and/or longitudinal distance of the door case 200. In further embodiments, the frame 201 may comprise a frame back side 204. The frame back side 204 may be opposed to the frame front side 202 and oriented substantially parallel to the frame front side. In further embodiments, the frame 201 may comprise a frame left side 206 oriented substantially orthogonally to the frame front side 202 and/or the frame back side 204. In further embodiments, the frame 201 may comprise a frame right side 208 opposed to the frame left side 206 and oriented parallel to the frame left side 206.

In further embodiments, the door case 200 may comprise a door retaining portion 210. By way of nonlimiting example, at least a portion of the door retaining portion 210 may be made from and/or in combination with, a semi-rigid, flexible, pliable, and/or non-rigid material such as, but not limited to, for example, wood composite, Styrofoam, thermoplastic urethane, thermoplastic polymer, thermoplastic elastomer, silicone, various resin types, memory foam, and/or any other suitable material. The door retaining portion 210 may be used to house, retain, and/or contact at least a portion of one or more vehicle doors. In some embodiments, the door retaining portion 210 may be securely mounted on the frame 201 such that at least a portion of the door retaining portion 210 is accessible and/or vertically protrudes from the frame 201. The door retaining portion 210 may comprise one or more cavities (and/or recesses) 212. The one or more cavities 212 may be used to receive at least a portion of the one or more vehicle doors. In some embodiments, each the one or more cavities 212 may be accessible via an aperture disposed on a top side of the door retaining portion 210. In some embodiments, at least a portion of a top side of the door retaining portion 210 may be substantially planar (with the exception of the cavities 212). One or more (e.g., each) of the one or more cavities 212 may be dimensioned proportionally to the dimensions (length and/or width) of a specified vehicle door (e.g., a removable Jeep™ door), such that the vehicle door is contacts one or more walls within the cavity 212, thereby helping to prevent or restrict undesired movement responsive to vibration, torque, and/or force being exerted on the door (e.g., during towing of the apparatus 100).

B. One or More Retractable Casters 300

As shown in FIGS. 1-6, the apparatus 100 may include one or more retractable casters 300 consistent with an embodiment of the disclosure. The one or more retractable casters 300 may be used to traverse (e.g., roll) the apparatus 100 over a substantially flat surface. The one or more retractable casters 300 may be used to provide portability and/or stability when the apparatus 100 is detached a vehicle trailer hitch, providing the apparatus 100 with rollable contact on a surface below the trailer hitch (e.g., the ground, a floored surface, a paved surface, etc.). The one or more retractable casters 300 may be further used to adjust the vertical orientation and/or height of the apparatus 100. The one or more retractable casters 300 allowing dismounting/disengaging of the apparatus 100 from a vehicle hitch and/or mounting/engaging of the apparatus with the vehicle, with or without the vehicle doors secured to the apparatus 100. In some embodiments, the one or more casters 300 may help to maintain substantially the same height as the vehicle hitch. The one or more casters 300 may allow the apparatus to be rolled to or from the vehicle after disengagement while at said height, thereby allowing for easier future mounting/engaging, and reducing the requirement of having a separate support mechanism for disengaging the apparatus 100 from the vehicle hitch.

At least one (e.g., each) of the one or more retractable casters 300 may be used to aid in dismount/disengagement of the apparatus 100 from a vehicle hitch via vertically extending downwards from a collapsed position to an extended position. In the extended position, the caster 300 may contact the surface below the apparatus 100. In embodiments, the caster 300 may include a locking mechanism configured to selectively lock the caster 300 in a particular position. For example, the locking mechanism, when engaged, may lock the caster 300 in the extended position, preventing the retractable caster from retracting to the collapsed position. This may be advantageous when an operator is mounting/engaging or dismounting/disengaging the apparatus from the vehicle. Alternatively or additionally, the locking mechanism may, when engaged, lock the caster 300 in the collapsed position, preventing the caster from moving to the extended position until the locking mechanism is disengaged. This may be advantageous while the apparatus 100 is connected to the vehicle hitch and in use (e.g., while the apparatus is being towed), The locking mechanism may allow the apparatus to maintain substantially the same height (e.g., the same height as the height of the hitch), thereby allowing easier disengagement of the apparatus 100 from the hitch.

In some embodiments, at least one (e.g., each) of the one or more retractable casters 300 may comprise a frame securing portion 302. The frame securing portion 302 may be used to secure the caster to a corner of the frame 201. The frame securing portion 302 may be further used to guide and/or receive a caster leg 304. In some embodiments, the caster leg 304 may be configured to retractably extend in a vertical direction (e.g., downward). In some embodiments, the caster leg 304 may have a plurality of predetermined apertures and/or notches spanning at least a portion of the length of the caster leg 304 to aid in height adjustment and/or securing at a desired height. The plurality of apertures and/or notches may be configured to receive a securing device such as, but not limited to, a pin, a nut, a bolt, a screw, a gear, a latch, and/or any other suitable component configured to engage an aperture. Alternatively or additionally, one or more (e.g., each) of the retractable casters may be movable using, for example, an electric motor, a hydraulic pump, a pneumatic pump, and/or any other actuator, pump, and/or motor that is useful in moving the retractable caster from a retracted position to a deployed position. In some embodiments a single controller may be used to move all the casters concurrently. Alternatively or additionally, each caster may be controlled and/or moved independently of the other casters.

In further embodiments, at least one (e.g., each) of the one or more retractable casters 300 may comprise a wheel 306. The wheel 306 may be disposed below the frame securing portion 302. For example, the wheel may disposed at a lower end of the caster leg 304, In some embodiments, the wheel 306 may be capable of swiveling or rotating about an axis defined by the leg 304 based on a direction of travel of the apparatus 100. It is noted that the wheel 306 may be embodied as a caster, with or without a stationary or rotatable fork, with or without a swivel joint, and with or without a flat top plate.

C. Plurality of Door Case Walls 400

As shown in at least FIGS. 1-6, the apparatus 100 may include plurality of door case walls 400 consistent with an embodiment of the disclosure.

In some embodiments, the plurality of door case walls 400 may comprise a front door case wall 402. The front door case wall 402 may be used to provide an additional means of retaining at least a portion of any component housed on or within the apparatus 100. The front door case wall 402 may be secured to (and span at least a portion of) the frame front side 202. From the frame front side 202, the front door case wall 402 may extend upwards above the frame front side 202 and/or the door retaining portion 210. In some embodiments, the front door case wall 402 may be configured to collapse and/or fold into a compartment of the door retaining portion 210 and/or under the frame 200.

In some embodiments, the plurality of door case walls 400 may comprise a rear door case wall 404. The rear door case wall 404 may be used to provide an additional means of retaining at least a portion of any component housed on or within the apparatus 100. The rear door case wall 404 may be secured to (and span at least a portion of) the frame back side 204. From the frame back side 204, the rear door case wall 404 may extend upwards above the frame back side 204 and/or the door retaining portion 210. In some embodiments, the rear door case wall 404 may be configured to collapse and/or fold into a compartment of the door retaining portion 210 and/or under the frame 201.

D. Door Securing System 500

As shown in at least FIGS. 1-6, the apparatus 100 may include a door securing system 500 consistent with an embodiment of the disclosure. The door securing system 500 may be used to selectively secure one or more vehicle doors within the door retaining portion 210. In embodiments, the door securing system 500 may interact with (e.g., pass through) a window aperture of each of the one or more vehicle doors. In this way, the door securing system 500 may trap the vehicle doors between the door securing system 500 and the door retaining portion 210 (e.g., within a respective one of the cavities 212).

In some embodiments, the door securing system 500 may comprise a front securing portion 502. The front securing portion 502 may be made from a rigid material, semi-rigid material, flexible material, and/or combination thereof. The front securing portion 502 may be disposed adjacent to the frame front side 202. In some embodiments, the front securing portion 502 may have a substantially inverted "L" shape. In further embodiments, the front securing portion 502 may have a substantially inverted "V" shape. In yet other embodiments, the front securing portion 502 may have any other suitable arrangement and/or shape to facilitate securing the one or more vehicle doors within the door retaining portion 210.

In embodiments, a first part of the front securing portion 502 may extend vertically upward from a first distal end secured to the frame front side 202. A second part of the front securing portion 502 may extend substantially orthogonally (and/or diagonally/sloping downward) relative to the first part of the front securing portion 502, through the window aperture of at least a portion of the one or more vehicle windows. The front securing portion 502 may be configured to rotate, pivot, and/or fold in various directions and manners in furtherance of selectively engaging and disengaging the one or more vehicle doors and/or a back securing portion 504.

In some embodiments, the door securing system 500 may comprise a back securing portion 504. The back securing portion 504 may be made from a rigid material, semi-rigid material, flexible material, and/or combination thereof. In some embodiments, the back securing portion 504 may have a substantially inverted "L" shape. In other embodiments, the back securing portion 504 may have a substantially inverted "V" shape. In yet other embodiments, the back securing portion 504 may have any other suitable arrangement and/or shape to facilitate securing the one or more vehicle doors.

In further embodiments, a first part of the back securing portion 504 may extend vertically from a first distal end secured to the frame back side 204. A second part of the back securing portion 504 may extend substantially orthogonally (and/or diagonally/sloping downward) relative to the first part of the back securing portion 504, through the window aperture of at least a portion of the one or more vehicle windows. The back securing portion 504 may be configured to rotate, pivot, and/or fold in various directions and manners in furtherance of selectively engaging and disengaging the one or more vehicle doors and/or the front securing portion 502.

When in a locked and/or securing position configured to secure the one or more vehicle doors, a second distal end of the back securing portion 504 may contact, overlap, and/or be in relative proximity to a portion of a second distal end of the front securing portion. In some embodiments, the front securing portion 502 and the back securing portion 504 may be secured to one another via any suitable securing means.

In the locked and/or securing position, the one or more vehicle doors are inhibited and/or prevented from removal from the apparatus 100 due to the first distal end of the front securing portion 502 being secured to the frame front side 202, the front securing portion 502 being further secured to the back securing portion 504 via the second distal end, and the first distal end of the back securing portion 504 being secured to the frame back side 204.

E. Pivotable Mount 600

As shown in at least FIGS. 1-6, the apparatus 100 may include a pivotable mount 600 consistent with an embodiment of the disclosure. The pivotable mount 600 may be used to pivotably rotate the door case 200 while the apparatus 100 is secured to the trailer hitch.

In some embodiments, the pivotable mount 600 may comprise a door case support member 602. The door case support member 602 may be used to provide structural support to the door case 200. The door case support member 602 may be disposed underneath the frame 201. For example, the door case support member 602 may be mounted flus with a lower surface of the frame 201. In some embodiments, the door case support member 602 may be pivotably secured (relative to the frame 201) proximate to a bottom side of the frame 201.

In some embodiments, the door case mount 600 may comprise a door case securing portion 604. The door case securing portion 604 may be used to fixedly secure the pivotable mount 600 to the door case 200. The door case securing portion 604 may be used to selectively inhibit or prevent axial rotation of the door case 200. In some embodiments, when in a fixedly secure state, the door case securing portion 604 may be secured to a least a portion of the frame back side 204 via any suitable securing means including, but not limited to, a bolt/screw and flange combination, a snap fit, a friction fit, a magnet configuration, and/or a bolt-nut configuration.

In some embodiments, the pivotable mount 600 may comprise a hitch connecting member 606. The hitch connecting member 606 may be used to removably secure the pivotable mount 600 to the vehicle hitch on a first distal end. The hitch connecting member 606 may (laterally) extend from a portion of the door case support member 602 having, but not limited to, a cantilever-like embodiment. In embodiments, the hitch connecting member 606 is rotatably secured to the door case support member 602.

The pivotable mount 600 may allow for the apparatus 100 to pivot between an open position and a closed position when the door case securing portion 604 is disengaged from the door case 200 and/or the hitch connecting member 606.

In the open position, the door case securing portion 604 may be disengaged from the hitch connecting member 606 and/or the door case 200, and the door case 200 is axially rotated away from the vehicle hitch about an axis disposed at or near a corner of the door case 200, such that a portion of the door case support member 602 is exposed and/or visible from underneath the door case 200 and a rear door and/or storage portion of the vehicle may be opened and/or accessible. In non-limiting example embodiments, the assembly 100 may be rotated approximately 45 degrees, approximately 90 degrees, approximately 135 degrees, or any other amount that permits access to the rear door and/or storage portion of the vehicle without detaching the assembly from the vehicle and/or unloading the assembly. In embodiments, the door case securing member 604 may be used to retain the door case 200 in the open position. In the open position, the vehicle rear compartment (e.g., tailgate, door, lift gate, trunk, etc.) may be accessible when the door case 200 is in the open position.

In the closed state, the door case securing portion 604 may be fixedly engaged to the trailer hitch and the door case 200 is substantially disposed underneath and flush to the bottom side of the frame 201 such that the door case support member 602 is not exposed from underneath the door case 200. In some embodiments, when the door case 200 is in the open position, the vehicle rear compartment (e.g., tailgate, door, lift gate, trunk, etc.) may be block or impeded from opening by the door case.

F. One or More Brake Lights 700

As shown in at least FIGS. 1-6, the apparatus 100 may optionally include one or more brake lights 700 consistent with an embodiment of the disclosure. The one or more brake lights 700 may be used as substitute vehicle brake lights in place of or in addition to the vehicle brake lights to illuminate an indication of braking of the vehicle that the apparatus 100 is secured to. In some embodiments, the one or more brake lights 700 may be electrically connected to a vehicle brake light circuit such that the one or more brake lights activate responsive to the vehicle's brake lights being activated. The one or more brake lights 700 may be secured to the frame back side 204.

III. Apparatus/System Use

Embodiments of the present disclosure provide a system operative by a set of methods comprising instructions configured to operate the aforementioned components in accordance with the methods. The following depicts an example of a method of a plurality of methods that may be performed by at least one of the aforementioned components. Various hardware components may be used at the various stages of operations disclosed with reference to each component.

For example, although methods may be described to be performed by a single component, it should be understood that, in some embodiments, different operations may be performed by different components in operative relation with one another. For example, an apparatus may be employed in the performance of some or all of the stages disclosed with regard to the methods. As such, the apparatus may comprise at least one architectural component disclosed herein.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

Consistent with embodiments of the present disclosure, a method 1000 for securing a plurality of vehicle doors to a hitch-mounted door carrier assembly may be performed by at least one of the aforementioned components, illustrated at least in FIG. 15. The method 1000 may comprise the following stages:

1. 1005—removing a plurality of doors from a vehicle;
2. 1010—placing each of the plurality of doors into a corresponding cavity 212 of a hitch-mounted door carrier assembly or apparatus 100;
3. 1015—orienting a front securing bracket 502 such that a second section of the front securing bracket 502 is extended through window apertures of at least a portion of the plurality of doors,
   a. The first section of the front securing bracket being connected to a frame front side 202 of a frame 201;
4. 1020—orienting a second securing bracket 504 such that a second section of the second securing bracket 504 is extended through window apertures of at least a portion of the plurality of doors and in physical contact with the second section of the front securing bracket 502,
   a. The first section of the front securing bracket being connected to a frame back side 204 of a frame 201;
5. 1025—securing the first securing bracket 502 to the second securing bracket 504 such that the plurality of doors are prevented from undesired removal from the hitch-mounted door carrier assembly or apparatus 100.

Consistent with embodiments of the present disclosure, a method 2000 for dismounting a hitch-mounted door carrier assembly from a vehicle hitch may be performed by at least one of the aforementioned components, illustrated at least in FIG. 16. The method 2000 may comprise the following stages:

1. 2005—Providing a hitch-mounted door carrier assembly or apparatus 100 secured to a vehicle hitch,
   a. having one or more retractable casters 300 in a retracted state,
   b. optionally having one or more vehicle doors secured to the apparatus 100;
2. 2010—Vertically extending (in a downward direction) the one or more retractable casters 300 such that wheels on the one or more retractable casters contact a surface below the apparatus 100;
3. 2015—placing the one or more retractable caters 300 in a locked position such that vertical movement is inhibited;
4. 2020—disengaging a hitch connecting member 606 of a pivotable mount 600 from a vehicle hitch;
5. 2025—transferring the weight of the door case 200 from the hitch to the one or more retractable casters 300.

Although the stages are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

IV. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The invention claimed is:

1. A hitch-mounted door carrier assembly comprising:
   a vehicle door case comprising a base, and a case body, the case body having a plurality of cavities, wherein each of the plurality of cavities is configured to receive and retain a door removed from a vehicle;
   a plurality of retractable wheels affixed to the vehicle door case, each of the plurality of wheels being configured to retractably extend orthogonally to the base, each of the plurality of wheels being disposed at a corner of the vehicle door case;
   a securing bracket including:
      a back bracket having a first portion configured to attach to a back side of the vehicle door case and a second portion configured to extend orthogonally from the first portion and through a window opening of at least one vehicle door, of the plurality of vehicle doors,
      a front bracket having a first portion configured to attach to a front side of the vehicle door case and a second portion configured to extend orthogonally from the first portion and through the window opening of the at least one vehicle door, of the plurality of vehicle doors,
      wherein the front bracket and the back bracket are configured to lockingly connect to one another; and
   a pivotable mount configured to permit rotation of the vehicle door case, the pivotable mount comprising:
      a door case support member rotatably secured to the base of the vehicle door case,
      a door case securing portion configured to fixedly secure the pivotable mount to the door case, and
      a hitch connecting member extending from the door case securing portion.

2. The hitch-mounted door carrier assembly of claim 1, wherein the pivotable mount enables the hitch-mounted door carrier assembly to rotate between an open position and a closed position.

3. The hitch-mounted door carrier assembly of claim 2, wherein in the open position, the door case securing portion is disengaged from the hitch and the door case is axially rotated away from the vehicle hitch, such that a portion of the door case support member is exposed from underneath the door case.

4. The hitch-mounted door carrier assembly of claim 2, wherein in the closed position, door case securing portion is fixedly engaged to the hitch and the door case is substantially disposed underneath and flush to the base of the vehicle door case.

5. The hitch-mounted door carrier assembly of claim 1, wherein the vehicle door case is a rectangular prism.

6. The hitch-mounted door carrier assembly of claim 1, further comprising one or more brake lights secured to a rear side of the door case.

7. The hitch-mounted assembly of claim 6, wherein the one or more brake lights are electrically connected to an electrical system of the vehicle to which the hitch-mounted assembly is attached.

8. An apparatus configured to be mounted to a vehicle hitch, the apparatus comprising:
   a door case configured to receive and retain one or more removable doors of the vehicle;
   a plurality of wheel assemblies retractably mounted to the door case, each wheel assembly comprising:
      a wheel,
      a retractable leg, wherein the retractable leg connects the wheel to the door case, and
      a locking mechanism configured to selectively inhibit movement of the retractable leg,
      wherein the wheel assembly is configured to move between:
         an extended position in which the leg extends downward from the door case to a surface below the door case, and
         a collapsed position in which the wheel is held proximate to the door case;
   a security bracket configured to move between:
      an open configuration that allows at least one of the one or more removable doors to be removed from the door case, and
      a locked configuration that prevents the one or more doors from being removed from the door case; and
   a rotatable hitch configured to releasably connect the door case to the vehicle, the rotatable hitch configured to selectively allow the door case to rotate about an axis defined by a corner of the door case.

9. The apparatus of claim 8, wherein, in at least one wheel assembly, the wheel is rotatably attached to the retractable leg.

10. The apparatus of claim 8, further comprising one or more brake lights secured to a rear side of the door case.

11. The apparatus of claim 10, wherein the one or more brake lights are electrically connected to an electrical system of the vehicle to which the apparatus is mounted.

12. The apparatus of claim 8, wherein the rotatable hitch is configured to allow the door case to rotate between:
a closed position, wherein the door case impedes access to a rear cargo area of the vehicle, and
an open position, wherein the door case is rotated away from the vehicle to permit access to the rear cargo area.

13. The apparatus of claim 12, wherein the security bracket comprises:
a front bracket rotatably coupled to a front side of the door case, the front bracket having a front spacing bar extending vertically upward from the door case, and a front securing bar extending substantially orthogonally from the front spacing bar, wherein in the locked configuration, the front securing bar is rotated to pass through a window opening of at least one of the one or more doors.

14. The apparatus of claim 13, wherein the security bracket further comprises:
a rear bracket rotatably coupled to a rear side of the door case, the rear bracket having a rear spacing bar extending vertically upward from the door case, and a rear securing bar extending substantially orthogonally from the rear spacing bar, wherein in the locked configuration, the rear securing bar is rotated to pass through the window opening of at least one of the one or more doors; and
wherein the rear securing bar of the rear bracket is configured to interlock with the front securing bar of the front bracket.

15. An apparatus configured to be mounted to a vehicle hitch, the apparatus comprising:
a door case comprising one or more cavities, each cavity being configured to receive and retain a corresponding door of the vehicle;
a plurality of wheel assemblies retractably mounted to the door case, each wheel assembly being configured to move between:
an extended position in which a leg of the wheel assembly extends downward from the door case such that a wheel of the wheel assembly contacts a surface below the door case, and
a collapsed position in which the wheel assembly is held proximate to the door case;
a security bracket configured to selectively prevent removal of the doors from the one or more cavities; and
a rotatable hitch configured to releasably connect the door case to the vehicle, the rotatable hitch configured to allow the door case to rotate about an axis defined by a corner of the door case.

16. The apparatus of claim 15, wherein at least one of the one or more cavities is lined with a padded material.

17. The apparatus of claim 15, wherein the plurality of wheel assemblies is configured to support the weight of the door case and the one or more doors.

18. The apparatus of claim 15, wherein the rotatable hitch comprises:
a first portion attached to a base of the door case;
a second portion configured to be mounted to the vehicle hitch, wherein the second portion is rotatably coupled to the first portion; and
a locking mechanism configured to selectively inhibit rotation of the second portion relative to the first portion.

19. The apparatus of claim 15, further comprising one or more brake lights secured to a rear side of the door case, wherein the one or more brake lights are electrically connected to an electrical system of the vehicle to which the apparatus is mounted.

20. The apparatus of claim 15, wherein the door case is surrounded by a frame formed from aluminum.

* * * * *